United States Patent
Guo et al.

(10) Patent No.: US 7,222,290 B2
(45) Date of Patent: May 22, 2007

(54) METHOD AND APPARATUS FOR RECEIVER DETECTION ON A PCI-EXPRESS BUS

(75) Inventors: Chunbing Guo, Eatontown, NJ (US); Fuji Yang, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 505 days.

(21) Appl. No.: 10/822,027

(22) Filed: Apr. 9, 2004

(65) Prior Publication Data

US 2005/0104623 A1 May 19, 2005

Related U.S. Application Data

(60) Provisional application No. 60/520,917, filed on Nov. 18, 2003.

(51) Int. Cl.
*G06F 13/00* (2006.01)
*G01R 31/00* (2006.01)

(52) U.S. Cl. .................... 714/811; 710/302

(58) Field of Classification Search ........... 714/709, 714/811; 710/101, 302
See application file for complete search history.

(56) References Cited

U.S. PATENT DOCUMENTS

| | | | | |
|---|---|---|---|---|
| 5,568,610 A * | 10/1996 | Brown | ...................... | 714/48 |
| 5,632,019 A * | 5/1997 | Masiewicz | ................... | 713/300 |
| 5,680,288 A * | 10/1997 | Carey et al. | ................ | 361/118 |
| 5,714,809 A * | 2/1998 | Clemo | ........................ | 307/125 |
| 5,758,102 A * | 5/1998 | Carey et al. | ................ | 710/302 |
| 5,926,651 A * | 7/1999 | Johnston et al. | ............... | 710/52 |
| 6,062,480 A * | 5/2000 | Evoy | .......................... | 235/492 |
| 6,170,029 B1 * | 1/2001 | Kelley et al. | ............... | 710/302 |
| 6,502,212 B1 * | 12/2002 | Coyle et al. | .................. | 714/43 |
| 6,535,945 B1 * | 3/2003 | Tobin et al. | ................ | 710/305 |
| 6,690,199 B2 * | 2/2004 | Ajit | ............................. | 326/87 |
| 6,703,848 B2 * | 3/2004 | Cho | ........................... | 324/678 |
| 2003/0059746 A1 * | 3/2003 | Georges | ..................... | 434/118 |
| 2004/0164721 A1 * | 8/2004 | Kwatra et al. | ............. | 323/286 |
| 2004/0177301 A1 * | 9/2004 | Tarango et al. | ............. | 714/738 |
| 2005/0182988 A1 * | 8/2005 | McBride et al. | ........... | 713/401 |
| 2006/0230211 A1 * | 10/2006 | Woodral | ..................... | 710/302 |

FOREIGN PATENT DOCUMENTS

WO  WO 98/28886  2/1998
WO  WO 01/73465  4/2001

* cited by examiner

*Primary Examiner*—Stephen M. Baker

(57) ABSTRACT

A method and apparatus are provided for detecting a receiver over a PCI-Express bus. A receiver is detected on a PCI-Express link by adjusting a common mode voltage using a current injected into one or more transmitter output nodes and detecting whether a receiver is present based on a voltage change rate. The current can be injected, for example, by a charge pump. In various embodiments, the charge pump can be integrated with a CML transmit buffer or an H-bridge type of transmit buffer. The amplitude control circuit can compare the adjusted common mode voltage to one or more predefined voltages and maintain the adjusted common mode voltage between two predefined voltages. The amplitude control circuit provides a signal to the charge pump to control the current injected into the transmitter output nodes. The amplitude control circuit also provides a signal to an exemplary timer that measures the voltage change rate.

20 Claims, 7 Drawing Sheets

METHOD AND APPARATUS FOR RECEIVER DETECTION ON A PCI-EXPRESS BUS

CROSS REFERENCE TO RELATED APPLICATIONS

This application claims the benefit of U.S. Provisional Application No. 60/520,917, filed Nov. 18, 2003.

FIELD OF THE INVENTION

The present invention relates generally to receiver detection techniques and, more particularly, to methods and apparatus for detecting a receiver on a Peripheral Component Interconnect Express link system.

BACKGROUND OF THE INVENTION

The Peripheral Component Interconnect (PCI) specification (downloadable from www.pci-sig.com) defines how one or more peripheral devices can communicate with a computing device over a serial input/output bus link. The serial link can be within a single computing device or can link one or more computing devices and peripheral devices. The original PCI specification defines a 32-bit PCI bus that operates at 33 MHz with a peak throughput of 132 Megabytes/second. Until recently, the performance of the original PCI specification was adequate for most applications. As the processing rates of commercially available processors have increased, the processing capacity of the processors to process data eventually exceeded the capacity of the PCI bus to deliver data. Thus, recent piocessors can process data faster than the PCI bus can deliver the data to processor.

An updated version of the PCI specification, referred to as PCI Express, proposes to improve the computer performance by increasing the flow of data between a processor and various peripheral devices, such as network cards, printers and storage disks. Rather than transmitting data on a parallel bus, which limits the maximum transmitting speed, PCI-Express uses high speed serial lanes at 2.5 Gbit/second or higher to transmit the data. When multiple lanes are used, e.g., 32 lanes, the maximum speed can be up to 80 Gbit/second.

In addition, PCI-Express includes a number of new features that are said to improve reliability, timing and scalability of the bus. For example, the PCI-Express standard requires that transmitters support a "receiver detect" function that allows a transmitter to determine whether there is a receiver present at the far end of a communication link. A need therefore exists for a receiver detection circuit that may be employed by a transmitter that communicates over a PCI-Express bus.

SUMMARY OF THE INVENTION

Generally, a method and apparatus are provided for detecting a receiver over a PCI-Express bus. A receiver is detected on a PCI-Express link by adjusting a common mode voltage using a current injected into one or more transmitter output nodes and detecting whether a receiver is present based on a voltage change rate. The current can be injected, for example, by a charge pump under control of an amplitude control circuit. In various embodiments, the charge pump can be integrated with a CML transmit buffer or an H-bridge type of transmit buffer.

The amplitude control circuit optionally compares the adjusted common mode voltage to one or more predefined voltages and can maintain the adjusted common mode voltage between two predefined voltages. The amplitude control circuit provides a signal to the charge pump to control the current injected into the transmitter output nodes. The amplitude control circuit also provides a signal to an exemplary timer. The timer measures the change rate of the common mode voltage to determine whether a receiver is present and optionally generates a detection output flag indicating whether a receiver is present.

A more complete understanding of the present invention, as well as further features and advantages of the present invention, will be obtained by reference to the following detailed description and drawings.

DETAILED DESCRIPTION

Figure 1A:
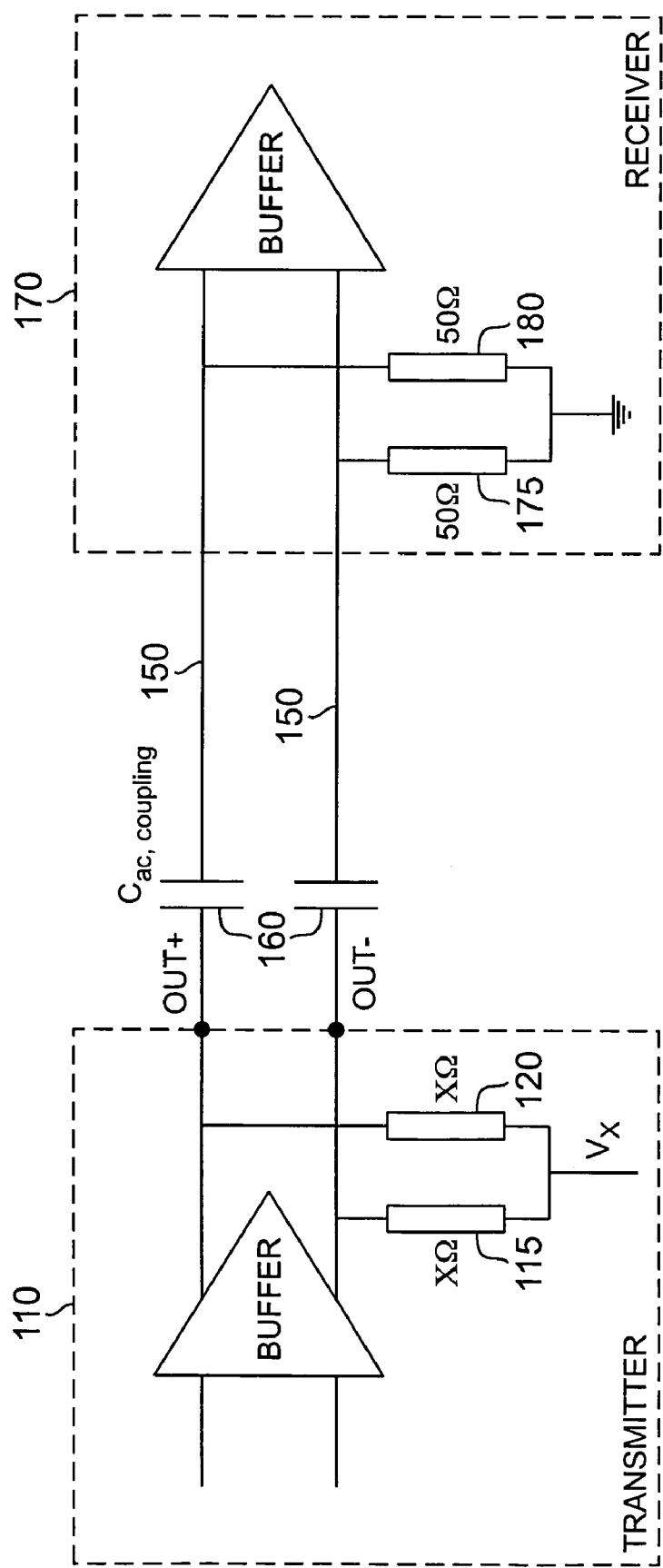
FIG. 1A is a schematic block diagram of a transmitter and receiver communicating over a PCI-Express link.

The present invention provides a receiver detection circuit 250, discussed further below in conjunction with FIG. 2, for use by a transmitter 110 that communicates over a PCI-Express link 150. FIG. 1A is a schematic block diagram of a transmitter 110 and receiver 170 communicating over a differential transmission line 150. AC coupling between the transmitter 110 and receiver 170 is used through the coupling capacitor 160. As shown in FIG. 1A, the transmitter 110 includes a pair of resistors 115, 120 between the differential transmission line 150 and ground. Similarly, the receiver 170 includes a pair of resistors 175, 180 between the differential transmission line 150 and ground. The resistors 115, 120, 175, 180 terminate the differential transmission line 150 to avoid reflections at higher speeds. The resistors 115, 120, 175, 180 typically have resistance values on the order of 50 Ohms.

The present invention recognizes that when the receiver 170 is present and connected to the transmission line 150, a large AC coupling capacitor 160 connected to the ground via the receiver termination resistors 175, 180 will act as a load to the transmitter 110. If a voltage step change is applied at the node Vx, the voltage at out+ and out− will follow the Vx changes. The voltage change rates at the output, out+ and out−, of the transmitter 110, however, is determined by a time constant approximately equal to $X \ast C_{ac,coupling}$, where X is the output impedance of the transmitter 110 (i.e., the value of the termination resistors 115, 120 in Ohms) and $C_{ac\_coupling}$ is value of the AC coupling capacitor 160 in Farads.

Figure 1B:
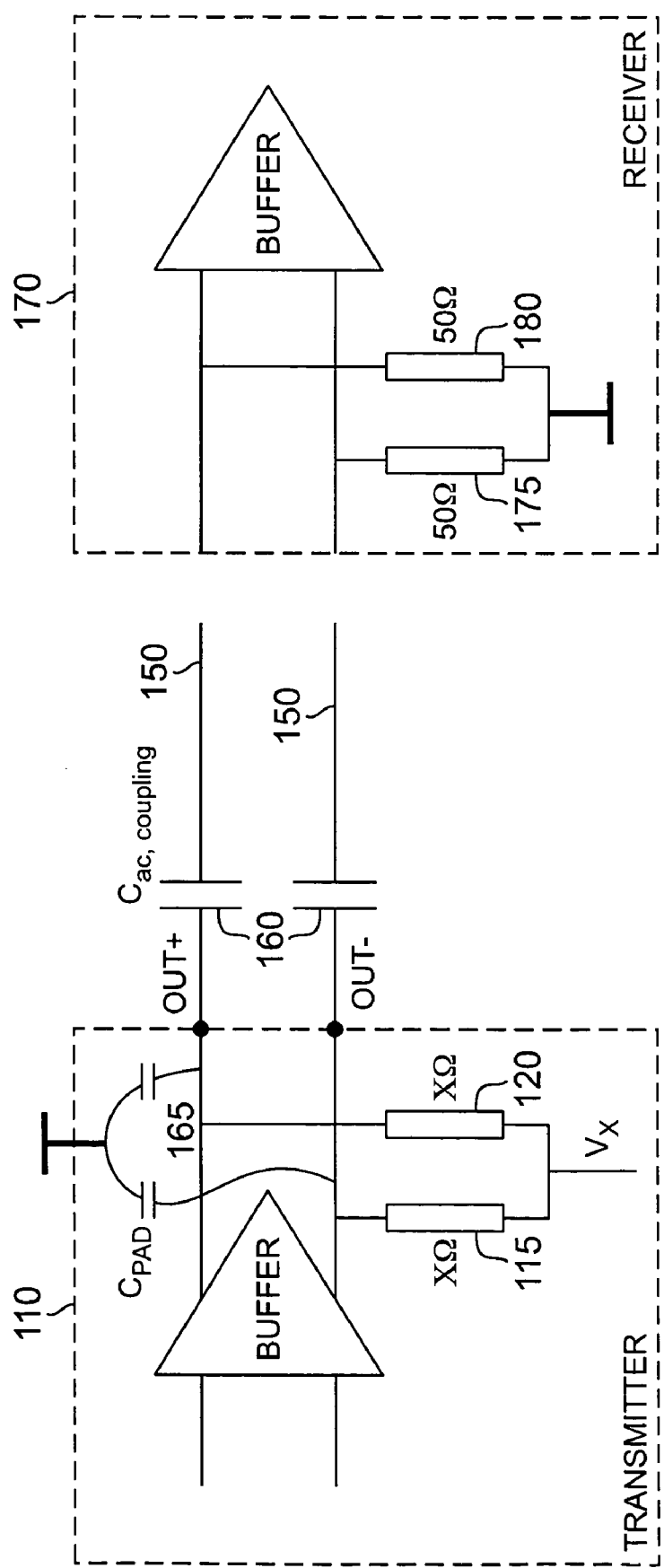
FIG. 1B is a schematic block diagram of the transmitter and receiver of FIG. 1A when the receiver is not connected to the PCI-Express link.

When the receiver is not present, as shown in FIG. 1B, the termination resistors 175, 180 of the receiver 170 will not be present and the load seen by the transmitter 110 will only be the parasitic capacitor associated with the nodes out+ and out−, referred to as the pad capacitance, $C_{PAD}$ 165. The voltage change rate at the output, out+ and out−, of the transmitter 110 is determined by a time constant $X*C_{PAD}$.

As the capacitance of the AC coupling capacitor 160 is much larger than the capacitance of the pad capacitor 165, a significant and measurable voltage change rate difference will be observed depending on whether a receiver 170 is present. According to one aspect of the present invention, the period of the output of the transmitter 110, referred to as the voltage change rate, is used to determine whether a receiver 170 is present on the PCI-Express link 150. As the link 150 is AC coupled with a large AC coupling capacitor 160 and the receiver 170 (when present) is terminated with 50 Ohm resistors 175, 180, a receiver detection circuit in accordance with the present invention detects whether a receiver 170 is present by measuring the voltage change rate of the transmitter 110.

Figure 2:
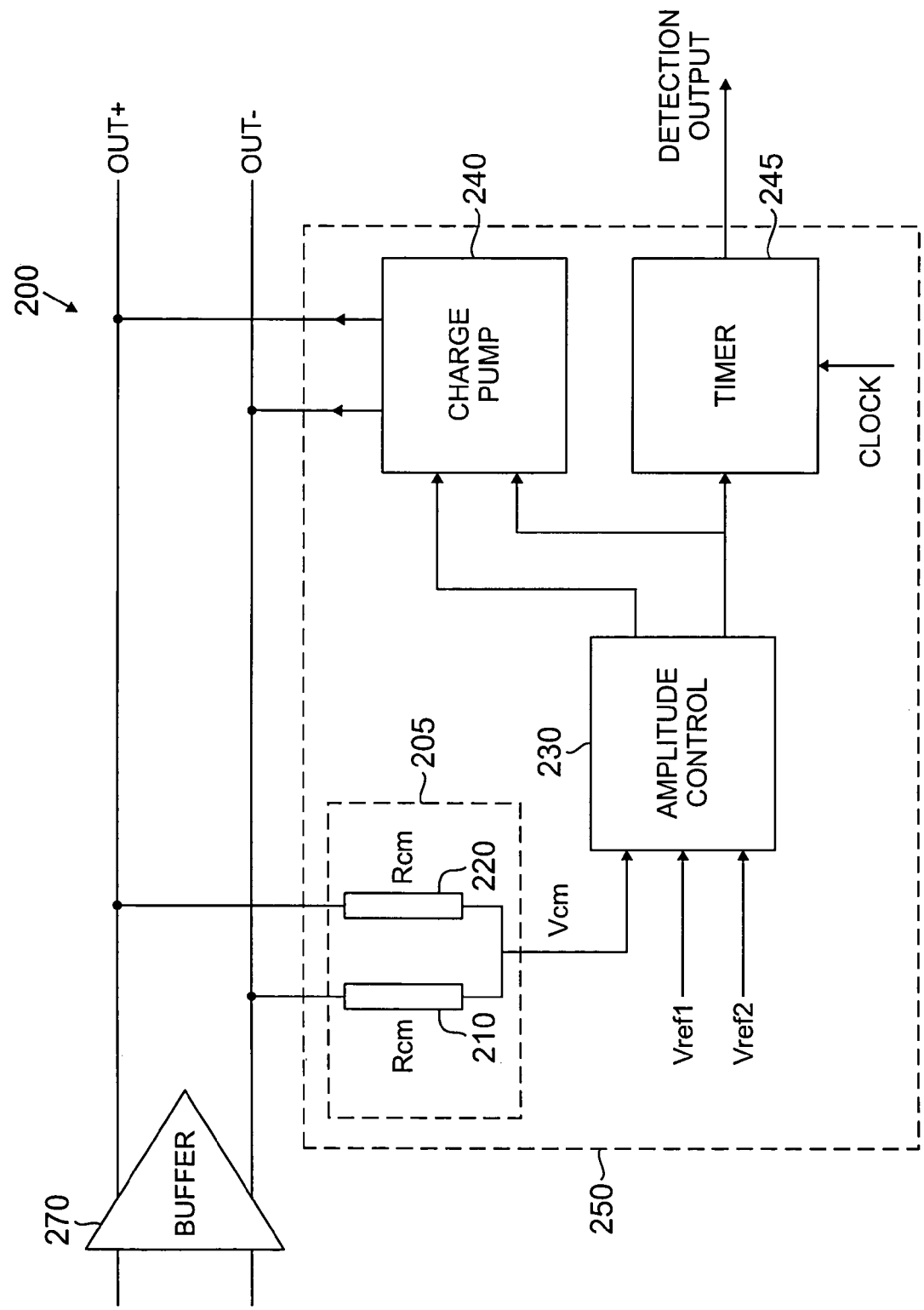
FIG. 2 is a schematic block diagram of a transmitter incorporating features of the present invention.

FIG. 2 is a schematic block diagram of a transmitter 200 incorporating features of the present invention. As shown in FIG. 2, the transmitter 200 includes a receiver detection circuit 250. Generally, the receiver detection circuit 250 detects whether a receiver (not shown) is present by measuring the voltage change rate at the transmitter 200. In one exemplary implementation, the receiver detection circuit 250 changes the output common voltage, $V_x$, of the transmitter 200 and detects the voltage change rate at the transmitter output nodes, out+ and out−. As previously indicated, if a receiver is present, the voltage change rate is approximately determined by the time constant $X*C_{ac,coupling}$. Likewise, if a receiver is not present, the voltage change rate is approximately determined by the time constant $X*C_{PAD}$. The receiver detection circuit 250 compares the measured voltage change rate to a threshold to determine whether a receiver is present.

In one exemplary implementation, shown in FIG. 2, the receiver detection circuit 250 employs a charge pump 240, discussed further below in conjunction with FIG. 4, associated with an amplitude control circuit 230, discussed further below in conjunction with FIG. 3, to vary the output common mode (CM) voltage of the transmitter 200. Generally, the receiver detection circuit 250 works as a relaxation oscillator. The charge pump 240 injects current into the output nodes, out+ and out−, of the transmitter 200 and thereby changes the common mode (CM) voltage of the transmitter 200. A common mode detection circuit 205 measures the output CM voltage of the transmitter 200. As shown in FIG. 2, the common mode detection circuit 205 is implemented as two resistors 210, 220 connected in series between the transmitter output node, out+ and out−. The value of the resistors 210, 220 is large compared to the termination resistors 115, 120 of the transmitter 200.

As discussed further below in conjunction with FIG. 3, the amplitude control circuit 230 compares the measured CM voltage, $V_{cm}$, of the transmitter 200 to predefined voltages Vref1 and Vref2, and ensures that the CM voltage change introduced by the charge pump 240 is between Vref1 and Vref2. A timer 245 measures the change rate of the CM voltage, $V_{cm}$, to determine whether a receiver is present. The timer 245 generates a detection output flag indicating whether a receiver is present. For example, the timer 245 can generate a flag having a binary value of one to indicate that a receiver is present or having a binary value of zero to indicate that a receiver is not present. The timer 245 is driven by a clock signal.

Figure 3:
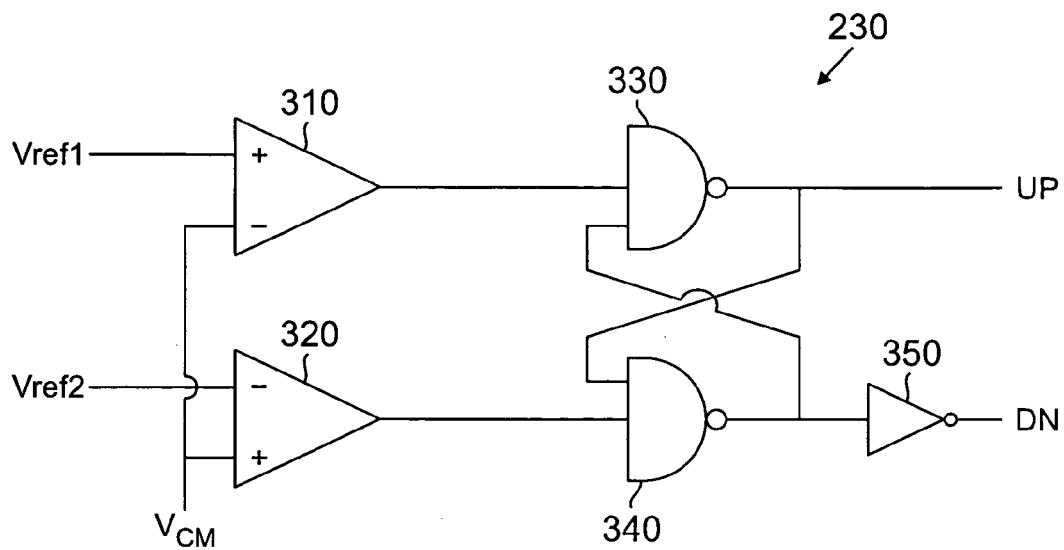
FIG. 3 is a schematic block diagram illustrating an exemplary amplitude control circuit of FIG. 2 in further detail.

FIG. 3 is a schematic block diagram illustrating an exemplary amplitude control circuit 230 of FIG. 2 in further detail. As shown in FIG. 3, the amplitude control circuit 230 includes a pair of voltage comparators 310, 320, a pair of nand gates 330, 340 having inverted outputs and an inverter 350. In operation, when starting the receiver detection process, the transmit buffer 270 (FIG. 2) is turned off and the transmitter 200 is in a high CM output impedance mode. If the measured CM voltage, $V_{cm}$, of the transmitter 200 is greater than the voltage Vref2 (Vcm>Vref2), the down control signal, DN, is enabled and the up control signal, UP, is disabled. As a result, the charge pump 240 will change the voltage at out+/out− (FIG. 2) towards Vref1.

If the measured CM voltage, $V_{cm}$, of the transmitter 200 is less than the voltage Vref1 (Vcm<Vref1), the down control signal, DN, is disabled and the up control signal, UP, is enabled. As a result, the charge pump 240 will change the voltage at out+/out− (FIG. 2) towards Vref2.

Figure 4:
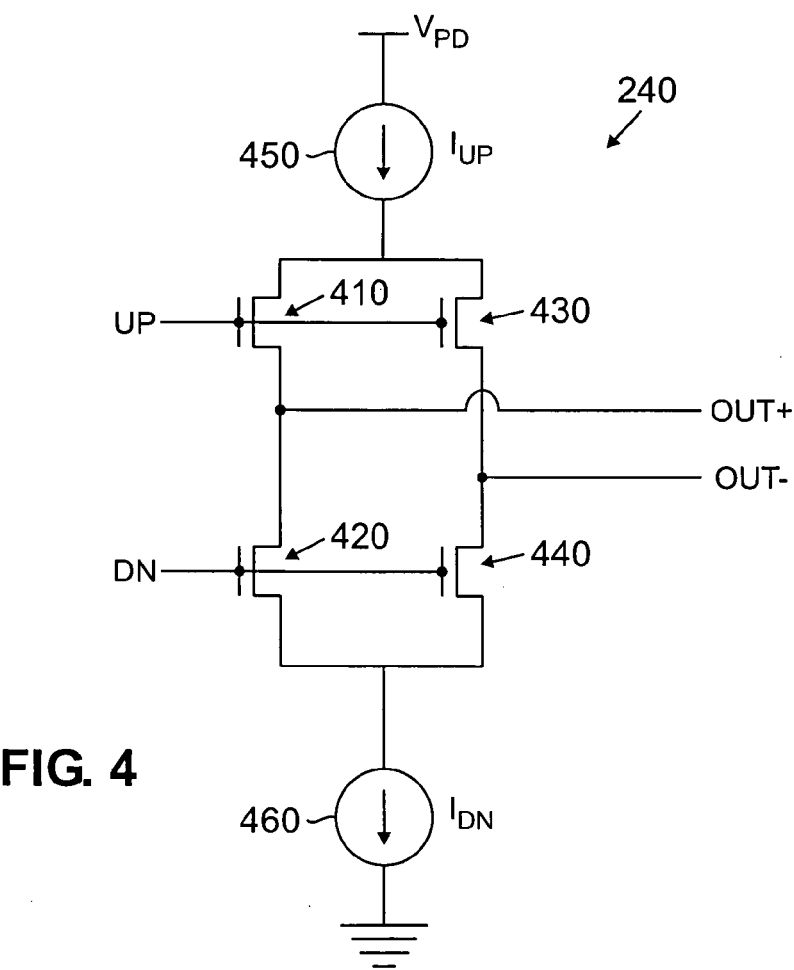
FIG. 4 is a schematic block diagram illustrating an exemplary charge pump of FIG. 2 in further detail.

FIG. 4 is a schematic block diagram illustrating an exemplary charge pump 240 of FIG. 2 in further detail. As shown in FIG 4, the charge pump 240 includes two PMOS transistors 410, 430 and two NMOS transistor 420, 440 and two current sources 450, 460. The transistors 410, 430, 420, 440 are connected to the UP and DN control signals, respectively, generated by the amplitude control circuit 230 of FIG. 3. The up current source 450 is active when the UP control signal is enabled by the amplitude control circuit 230 (i.e, when Vcm< Vref1) When the up current source 450 is active, the charge pump 240 will change the voltage at out+/out− towards Vref2. Likewise, the down current source 460 is active when the DN control signal is enabled by the amplitude control circuit 230 (i e., when Vcm> Vref2) When the down current source 460 is active, the charge pump 240 will change the voltage at out+/out− towards Vref1.

Figure 5:
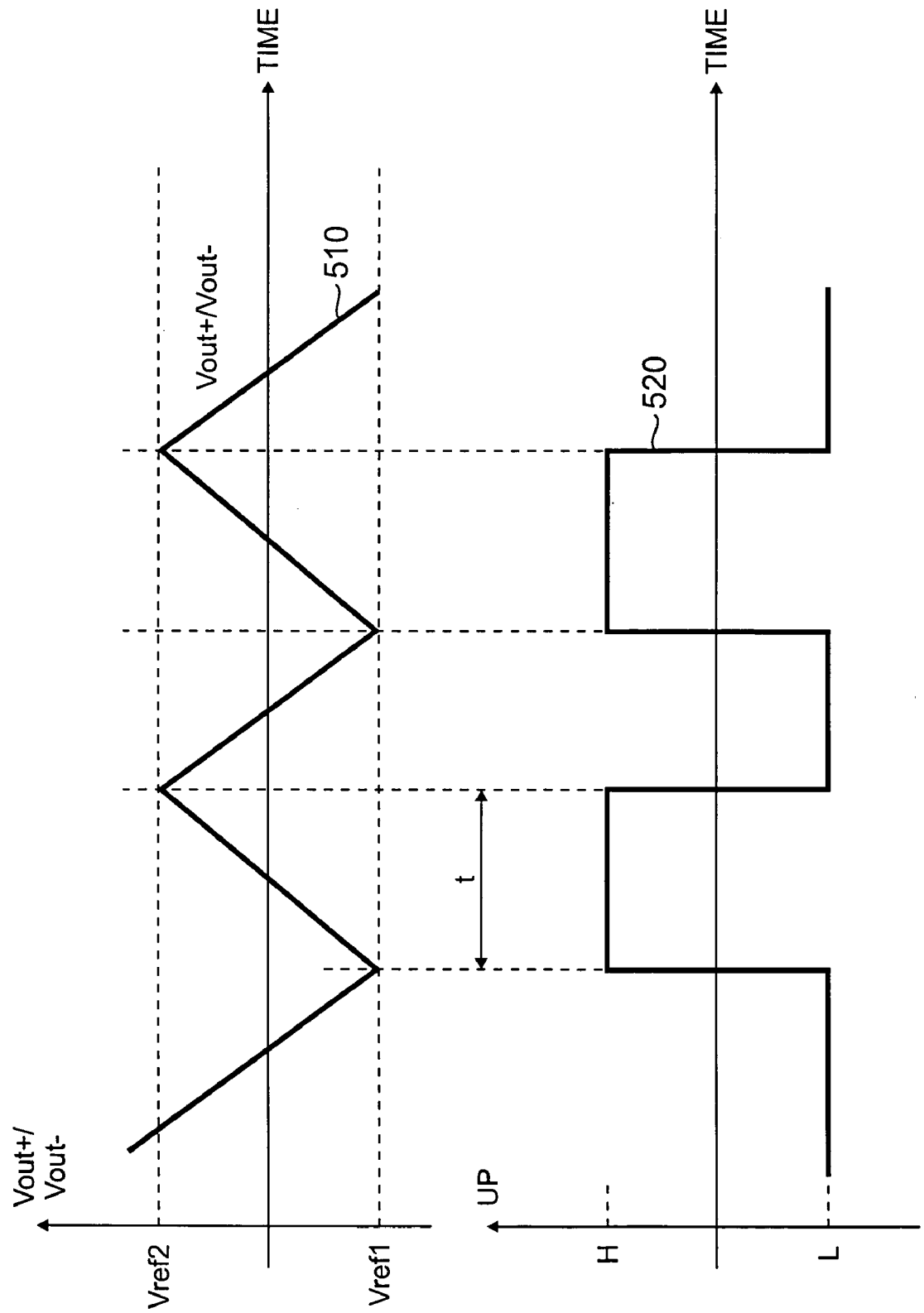
FIG. 5 illustrates the common mode voltage and UP control signal for the receiver detection circuit of FIG. 2.

FIG. 5 illustrates the common mode voltage, Vcm, (Vout+/Vout−) 510 and the UP control signal 520. As shown in FIG. 5, the common mode voltage, Vcm, is maintained between Vref1 and Vref2 by selective application of the UP and DN control signals, in the manner described above. As previously indicated, the timer 245 (FIG. 2) measures a change rate of the CM voltage, $V_{cm}$, to determine whether a receiver is present. The timer 245 measures the Vcm change rate by measuring the period, t, of the UP or DN control signal. The period, t, is inversely proportional to the Vcm change rate. If the period, t, exceeds a certain threshold (the threshold is dependent on the actual value of the PAD capacitor, $C_{PAD}$, 165 and AC coupling capacitor 160 used), the output of the timer 245 will be set to a binary value of one to indicate the presence of the receiver. If the period, t, is smaller than the threshold, the output of the timer 245 will be set to a binary value of zero to indicate that a receiver is not present.

Figure 6:
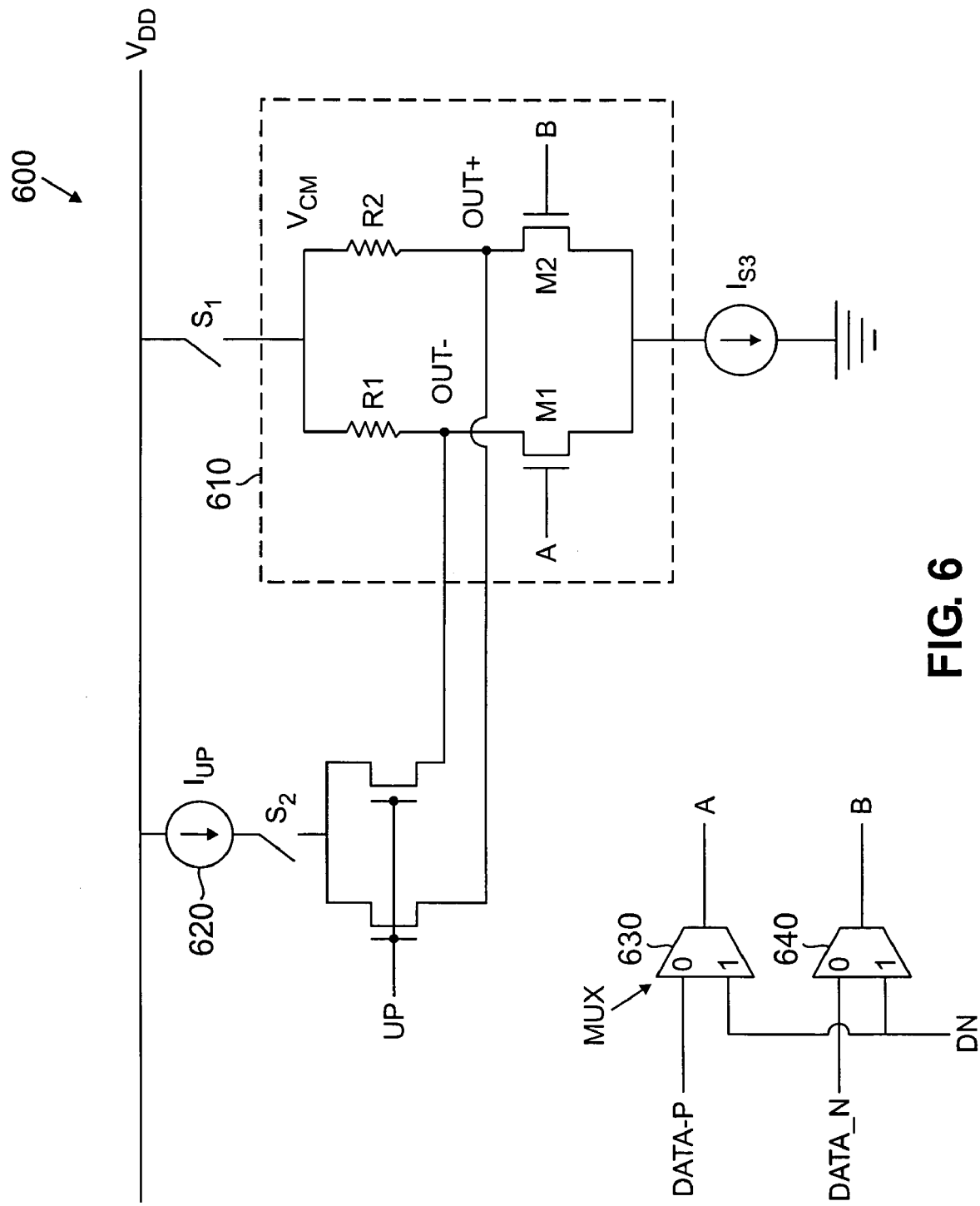
FIG. 6 is a schematic block diagram illustrating an alternate charge pump that may be employed when a current mode logic (CML) transmit buffer is used in the transmitter.

FIG. 6 is a schematic block diagram illustrating an alternate charge pump that may be employed when a current mode logic (CML) transmit buffer 270 is used. The circuit 600 includes a charge pump incorporated with the CML buffer. CML buffers are often used in high speed buffer design. The charge pump shown in FIG. 6 aims to share existing transistors in the CML buffer 270 in order to minimize the parasitic capacitance. The charge pump 240 discussed above in conjunction with FIG. 4, can be simplified with a CML buffer.

As shown in FIG. 6, the CML buffer 610 is controlled by a first switch S1 that can be in an open position in a receiver detection mode and in a closed position in a data mode. In addition, the integrated circuit 600 includes a second switch S2 that determines whether an up current source, $I_{UP}$, 620 is included in the circuit 600. The second switch S2 is in an open position in a data mode and in a closed position in a receiver detection mode.

The gate control signal of transistors M1 and M2 are controlled by two multiplexers 630, 640. When in a receiver detection mode, the two multiplexers 630, 640 are configured such that the output signals A, B have the same value as the down control signal, DN. In a data transmission mode, the two multiplexers 630, 640 are configured such that the output signals A, B have the same value as the respective data signals, Data_P and Data_N. The current source Iss can be made programmable so that in the receiver detection mode, Iss is equal to Iup. The output common mode voltage, $V_{CM}$, is directly sensed at node $V_{CM}$.

Figure 7:
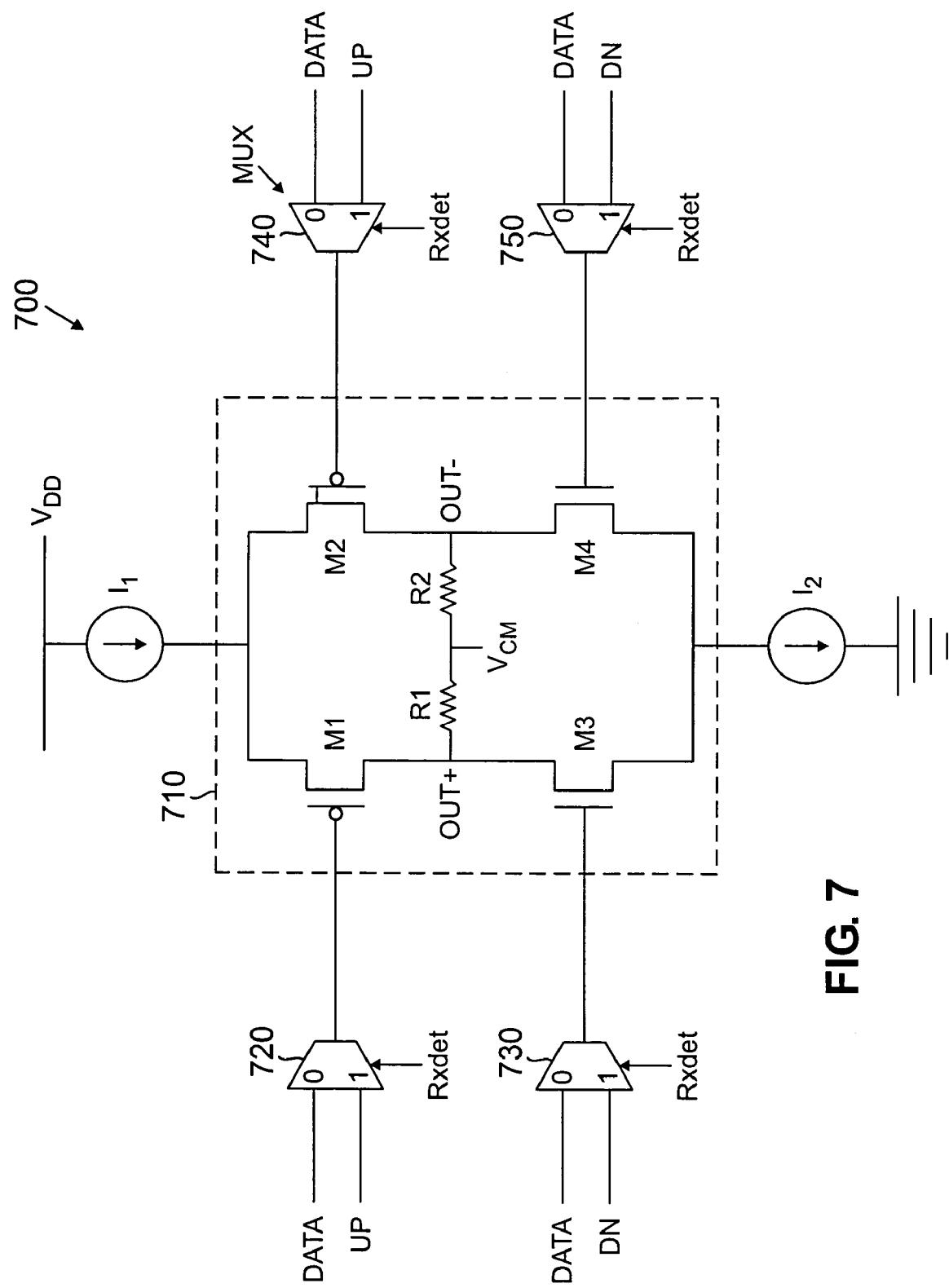
FIG. 7 is a schematic block diagram illustrating an alternate charge pump that may be employed when an H-bridge type of transmit buffer is used.

FIG. 7 is a schematic block diagram illustrating an alternate charge pump that may be employed when an H-bridge type of transmit buffer 710 is used. The circuit 700 includes a charge pump incorporated with the H-bridge type buffer 710. The H-bridge buffer 710 includes four transistors M1–M4 and can be configured as a charge pump in a receiver detection mode. As shown in FIG. 7, four multiplexers 720, 730, 740, 750 are used to select UP/DN signals (from the amplitude control circuit 230) in the receiver detection mode or select DATA inputs in a normal transmission mode as the input. The current sources $I_1$ and I2 can be set to a different value in the receiver detection mode in accordance with the UP and DN control signals, in a similar manner to the current sources $I_{UP}$ and $I_{DN}$ of FIG. 2. The CM voltage, $V_{CM}$, can be sensed directly at the middle point of two termination resistors R1 and R2, as shown in FIG. 7. The receiver detection control process may be performed in the manner described above in conjunction with FIG. 2.

It is to be understood that the embodiments and variations shown and described herein are merely illustrative of the principles of this invention and that various modifications may be implemented by those skilled in the art without departing from the scope and spirit of the invention.

We claim:

1. A method for determining whether a receiver is present on a PCI-Express link, said method comprising the steps of:
    adjusting a common mode voltage by injecting a current into one or more transmitter output nodes; and
    detecting whether a receiver is present on said PCI-Express link based on a voltage change rate.

2. The method of claim 1, further comprising the steps of measuring said adjusted common mode voltage and comparing said measured common mode voltage to one or more predefined voltages.

3. The method of claim 1, further comprising the steps of measuring said adjusted common mode voltage and maintaining said measured common mode voltage between two predefined voltages.

4. The method of claim 1, wherein said step of injecting a current is performed by a charge pump.

5. The method of claim 4, wherein said charge pump is integrated with a CML transmit buffer.

6. The method of claim 4, wherein said charge pump is integrated with an H-bridge type of transmit buffer.

7. The method of claim 4, wherein said charge pump is controlled by an amplitude control circuit.

8. A receiver detection circuit for use in a transmitter connected to a PCI-Express link, comprising:
    an amplitude control circuit to adjust a common mode voltage by initiating an injection of current into one or more transmitter output nodes; and
    a timer for detecting whether a receiver is present on said PCI-Express link based on a voltage change rate.

9. The receiver detection circuit of claim 8, further comprising a common mode detection circuit to measure said adjusted common mode voltage.

10. The receiver detection circuit of claim 9, wherein said common mode detection circuit is comprised of two resistors connected in series between said transmitter output nodes, out+ and out−.

11. The receiver detection circuit of claim 9, wherein said common mode detection circuit measures said adjusted common mode voltage and compares said measured common mode voltage to one or more predefined voltages.

12. The receiver detection circuit of claim 9, wherein said common mode detection circuit measures said adjusted common mode voltage and maintains said measured common mode voltage between two predefined voltages.

13. The receiver detection circuit of claim 8, further comprising a timer to measure a change rate of said adjusted common mode voltage to determine whether a receiver is present.

14. The receiver detection circuit of claim 13, wherein said timer generates a detection output flag indicating whether a receiver is present.

15. The receiver detection circuit of claim 8, wherein said injection of current is performed by a charge pump.

16. The receiver detection circuit of claim 15, wherein said charge pump is integrated with a CML transmit buffer.

17. The receiver detection circuit of claim 15, wherein said charge pump is integrated with an H-bridge type of transmit buffer.

18. The receiver detection circuit of claim 15, wherein said charge pump is controlled by an amplitude control circuit.

19. A receiver detection circuit for use in a transmitter connected to a PCI-Express link, comprising:
    means for adjusting a common mode voltage by initiating an injection of current into one or more transmitter output nodes; and
    means for detecting whether a receiver is present on said PCI-Express link based on a voltage change rate.

20. The receiver detection circuit of claim 19, wherein said injection of current is performed by a charge pump.

* * * * *